Oct. 14, 1969     Z. J. JANCZUR     3,472,483
VALVE FOR USE IN HIGH PRESSURE ENVIRONMENT
Filed March 13, 1967     2 Sheets-Sheet 1
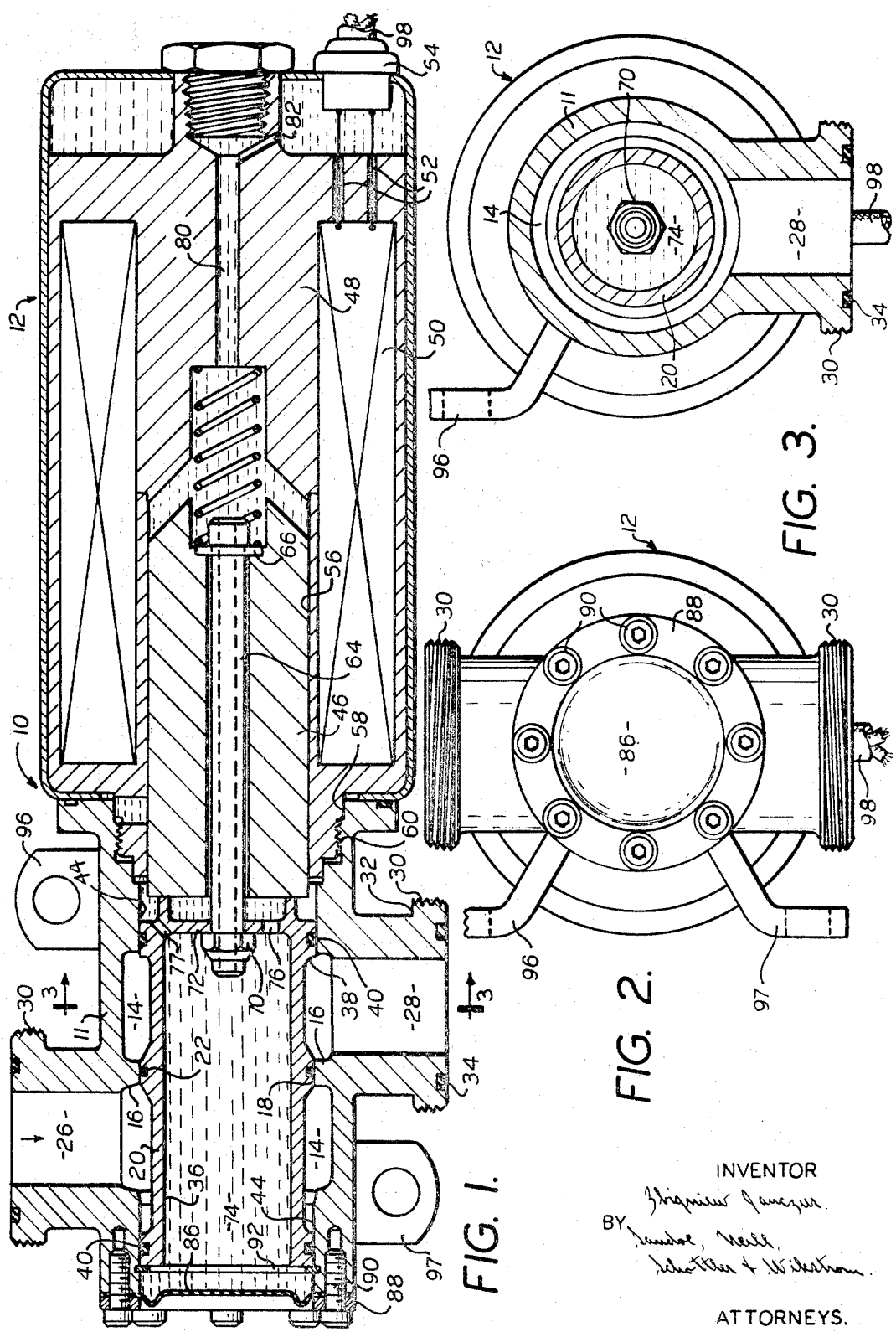
INVENTOR
Zbigniew Janczur
BY
Hundak, Neill,
Schottler & Wilkinson
ATTORNEYS.

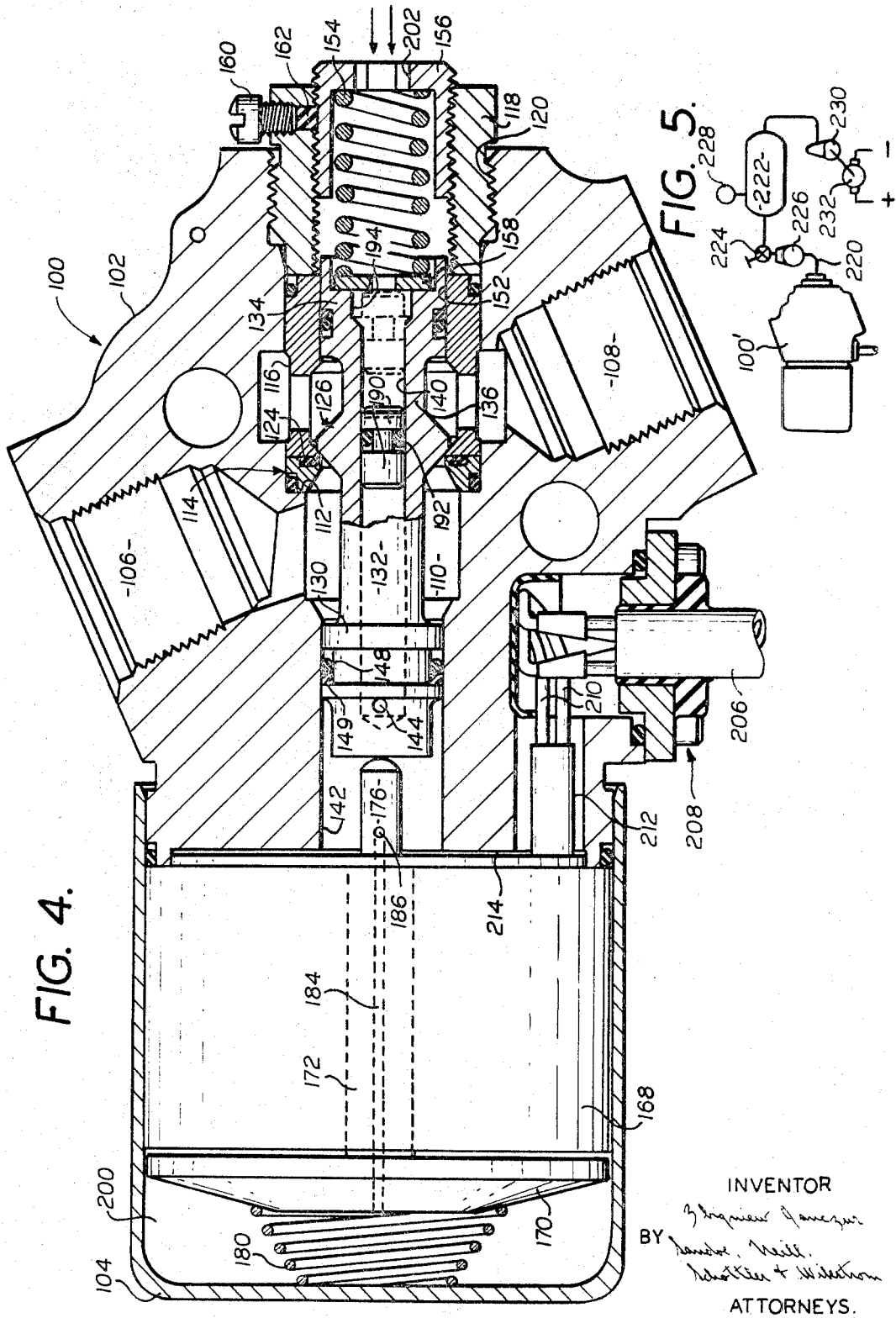

United States Patent Office 3,472,483
Patented Oct. 14, 1969

3,472,483
VALVE FOR USE IN HIGH-PRESSURE ENVIRONMENT
Zbigniew J. Janczur, Tustin, Calif., assignor to Marotta Valve Corporation, Boonton, N.J., a corporation of New Jersey
Filed Mar. 13, 1967, Ser. No. 622,552
Int. Cl. F16k 31/06, 51/00
U.S. Cl. 251—129                                 10 Claims

ABSTRACT OF THE DISCLOSURE

The valve housing has a valve chamber and an actuator chamber; and a valve in the valve chamber has seals for preventing leakage of fluid between the chambers. Liquid in the actuator chamber is subjected to pressure for compensating the pressure in which the entire housing may be submerged. For example: a valve for submarine use has a diaphragm, or other movable wall for the actuator chamber, exposed on one side to the sea water pressure so that the fluid in the actuator chamber and other spaces with which the actuator chamber connects, including guides for the valve, has the sea water pressure transmitted to it through the movable wall. The pressure on the pressure-compensating fluid in the housing can be generated by a pump instead of by pressure transmitted through a movable wall exposed to fluid in which the housing is submerged.

Brief description of the invention

This invention provides a valve housing with provision for pressurizing the interior of the housing with pressure to compensate that to which the outside of the housing is subjected. The principal object is to reduce the size and weight of the whole housing including the body. This is accomplished by providing a compensating pressure in the housing and in an actuator that occupies part of the housing; for example: in the covers for electromagnetic coils of actuators. For deep sea work, this makes it practical to use covers of substantially less mechanical strength, and it also eliminates the risk of seals and conductors being extruded from locations where the pressure of the sea water may seep in when the apparatus is in use.

The chamber in which the actuator is located communicates with other spaces in the housing, including guides in which portions of the valve move, and the compensating pressure liquid fills these other spaces at least as far as the seals in the guides which prevent flow of fluid between the valve chamber and the actuator chamber. Pressure on the compensating pressure liquid can be maintained by having a movable wall of the actuator chamber, or one of the spaces that communicates with it, and movement of this wall changes the combined volume of the actuator chamber and its communicating passages. This movable wall, if subjected on the outside to the pressure of sea water, or other fluid in which the valve housing is submerged, transmits the pressure to the compensating pressure fluid in the housing. This is the simplest way of varying the pressure within the housing to compensate changes in pressure outside the housing; but the pressure in the housing can be obtained by other means, such as a pump used to make the pressure in the housing correspond with whatever pressure is desired for the compensating effect.

One advantage of using a pump-generated pressure within the housing is that the pressure in the housing can be maintained somewhat higher than that outside the housing. Any leakage that occurs is to the outside and thus the parts in the housing are protected from the deleterious effects of sea water. Also, the leak can be detected by a drop in pressure and the requirement for repeated building up of the inside pressure.

Other objects, features and advantages of the invention will appear or be pointed out as the description proceeds.

Brief description of the drawing

In the drawing, forming a part hereof, in which like reference characters indicate corresponding parts in all the views:

FIGURE 1 is a sectional view through a magnetically operated valve with provision for maintaining inside pressure equal to that of a fluid in which the valve housing is submerged;

FIGURE 2 is an end view of the valve assembly shown in FIGURE 1;

FIGURE 3 is a sectional view taken on the line 3—3 of FIGURE 1;

FIGURE 4 is a sectional view, similar to FIGURE 1, but showing a modified form of the invention; and FIGURE 5 is a diagrammatic view showing the way in which FIGURE 4 is modified to obtain a pump-responsive pressure within the valve housing.

Detailed description of the invention

The valve assembly shown in FIGURE 1 includes a housing 10 which includes a body portion 11 and a shell 12. Within the body portion there is a valve chamber 14 having a partition 16 with an opening 18 for receiving a valve 20. In the construction illustrated, the valve 20 is a slide valve with a seal 22 that slides along the cylindrical face of the opening 18.

The valve chamber 14 has an inlet port 26 opening into the chamber 14 on one side of the partition 16. There is an outlet port 28 communicating with the chamber 14 on the other side of the partition 16. The inlet port 26 and the outlet port 28 open through integral parts of the body portion 11 with means for connection to piping. In the illustrated construction, these connecting means consist of threads 30 on flanges 32 at the outer ends of the ports 26 and 28; and there are preferably seals 34 in the outer faces of the flanges 32. The valve 20 has stem portions comprising pistons 36 and 38 at its opposite ends. The stem portions or pistons 36 and 38 operate in guides 44 having diameters equal to the diameter of the opening 18 so that the areas of the pistons 36 and 38 are equal to those of the opposite sides of the valve 20 at opening 18 for balancing the valve 20 with respect to the pressure in the chamber 14 on both sides of the partition 16. These piston portions 36 and 38 have seals 40 for preventing leakage of fluid from the chamber 14 along guides 44 in which the piston portions of the valve slide.

One end of the valve 20 is connected to an armature or plunger 46 of electromagnetic valve operating means which also includes a ferrous metal core 48 and a magnetizing coil 50 surounding the core 48. Current is supplied to the coil 50 through conductors 52 which lead frome the shell 12 through an outlet connection 54.

The plunger 46 slides in a cylindrical bearing 56 of the core 48, and the core fits into an opening 58 in the end of the body portion 11 of the valve housing. A portion of the opening 58 has threads 60 by which the core of the electromagnetic actuator is connected with the body portion 11.

The valve 20 is assembled with the armature 46 by a bolt 64 which has a head portion 66 abutting against a shoulder in a counterbore at the right-hand end of the plunger 46, as viewed in FIGURE 1. A nut 70 is threaded over the other end of the bolt 64. The valve 20 and plunger 46 should have approximately .009″ gap clearance.

The space within the shell 12, and in fact all spaces within the housing 10, except the chamber 14 and the ports 26, are filled with liquid 74. This liquid is preferably transformer oil. It ocupies the hollow interior of the valve 20 and there are passages 76 and 77 through the end wall 72 for permitting the spaces beyond the valve 20 to be filled with oil and to communicate with the oil space inside the valve 20. The space beyond the end of the plunger 46 communicates with the space inside the valve 20 through clearance around the bolt 64 and the plunger 46. There is a passage 80 leading through the open end of the core 48 to a branch passage 82 through which the space in the end of the shell 12 communicates with the liquid space within the valve 20. By various passages and clearances, oil 74 fills any clearances around conductors of the coil 50 and any other spaces in the housing 10 except the space which is sealed off by the seals 40 on the valve 20.

At the left-hand end of the housing 10 there is a flexible diaphragm 86 which forms the end wall of the body portion 11 of the housing. This flexible diaphragm 86 is clamped around its peripheral edge portion by a ring 88 attached to the side wall of the valve housing by a circle of screws 90. Travel of the valve 20 toward the diaphragm 86 is limited by a snap ring 92 in a circumferential groove in the guide 44 in which the piston portion 36 of the valve slides.

There is no wall or other obstruction at the end of the hollow portion of the valve 20 which is adjacent the diaphragm 86. Thus the space between the diaphragm 86 and the end of the valve 20 is filled with oil 74 and communicates with the hollow interior of the valve 20. Thus the liquid 74 contacts with the movable wall formed by the diaphragm 86 and any pressure against the outside of the diaphragm 86 is transmitted through the diaphragm to the liquid 74. When the valve is used for submarine work, the outside of the diaphragm 86 is exposed to the pressure of the sea water, and this pressure displaces the diaphragm 86 toward the oil 74 and puts the oil under the same pressure at the sea water. This pressure is transmitted by the oil to all of the spaces in the valve in which oil is present. The shell 12, therefore, is subject to the same pressure inside as from the sea water outside and even at great depths, there is no danger of crushing the shell because of this equalization of inside and outside pressures.

The housing 10 has lugs 96 and 97 for connecting it with a bulkhead or other support. There is a cable 98 through which power is supplied for energizing the motor means which operate the valve.

FIGURE 4 shows a modified form of the invention. A valve housing 100 has a body portion 102 and a shell 104. The body portion 102 has an inlet port 106 and an outlet port 108. Both of these ports are threaded for receiving piping connections which join the valve housing with the circuit in which the flow of fluid is to be cøntrolled.

The inlet port 106 opens into a valve chamber 110. This chamber has a shoulder 112 against which a seat assembly 114 is clamped by a retainer 116. The retainer 116 is held against the seat assembly 114 by a retainer nut 118 screwed into a threaded counterbore 120 at one end of the valve housing.

The seat assembly 114 has a seat 124 made of nylon or other suitable material; and there is a valve element 126 which moves toward and from the seat 124 to control passage of fluid through the valve housing.

The valve element 126 is hollow and it has a piston portion 130 connected to it on one side by a stem 132. The valve element 126 has another piston portion 134 connected to it on the other side by a stem 136. The hollow part of the valve element 126 includes a cylindrical passage 140 extending from the right-hand end of the valve element 126 through most of the length of the piston portion 130, and communicating with a guide 142, in which the piston portion 130 slides, through radial ports 144.

The piston portions 130 and 134 have O-ring seals 148 and backup rings 149 for the O-ring seals. The piston portion 134 slides in a cylindrical guide 152.

The valve element 126 is urged toward closed position by a spring 154 held at one end in a spring retainer 156 that threads into the retainer nut 118. The other end of the spring 154 contacts with a washer 158 that bears against a recessed end surface of the piston portion 134.

The load of the spring 154 can be regulated by screwing the spring retainer 156 one way or the other to move it axially along the threads which connect it with the retainer nut 118. The spring retainer 156 is locked in any adjusted position by a set screw 160 that threads through one side of the retainer nut 118 and that clamps a plastic block 162 against the thread of the spring retainer 156.

There is a magnetic coil 168 at the left-hand end of the valve housing and within the shell 104. The portion of the shell 104 beyond the coil 168 contains an armature 170 attached to a hollow rod 172 which extends through the center of the core of the coil 168. An extension 176 of the rod 172 contacts with the end of the piston portion 130 of the valve element 126.

When the valve element 126 is in closed position, as shown in the drawing, the piston portion 130 holds the rod 172 and its extension 176 in an axial position which spaces the armature 170 a slight distance from the magnetic coil 168. A conical coil spring 180 is compressed between the armature 170 and the end wall of the shell 104. This spring 180 is a light spring for holding the extension 176 in contact with the piston portion 130 so as to prevent vibration of the parts; but the strength of the spring 180 is very much less than that of the spring 154 so that it subtracts little from the effectiveness of the spring 154.

There is a passage 184 extending through the armature 170 and axially through the length of the rod 172 and for part of the length of the extension 176. At the right-hand end of the passage 184, there are radial ports 186 through which the passage 184 communicates with the guide in which the piston portion 130 slides.

Within the cylindrical passage 140 there is a piston 190 which is free to slide in the passage 140 and which has a sealing ring 192. This piston 190 can slide all the way to the left-hand end of the passage 140, but the washer 158 provides a stop for preventing the piston 190 from coming out of the right-hand end of the passage 140. There is a counterbore 194 at the open end of the passage 140, and this counterbore is deep enough to permit the sealing ring 192 to reach the shoulder formed by the counterbore 194 near the end of the passage 140. When the piston 190 contacts with the washer 158, the ring 192 no longer seals the passage 140 against the escape of fluid past the piston 190. FIGURE 4 shows the piston 190 in dotted lines at the end of its stroke and with its sealing ring 192 in position to permit fluid to escape through the clearance between the piston 190 and the sides of the cylindrical passage 140 in which the piston 190 is contained.

The valve element 126 is counterbalanced for pressure in the valve chamber 110, on both sides of the valve seat 124, by the piston portions 130 and 134 of the valve element.

Liquid 200, such as transformer oil, is contained within the shell 104 and this liquid fills any spaces between windings of the coil 168 and any other clearances within the shell 140. The liquid 200 completely surrounds the armature 170 and extends through the passage 184 and into the guide in which the piston portion 130 slides. The liquid also fills the radial ports 144 and the cylindrical passage 140 as far as the piston 190.

The other side of the piston 190 is subjected to pressure of water or any other fluid in which the valve housing 100 is immersed. Such environmental fluid enters the valve housing 100 through an opening 202 in the spring retainer 156, and this environmental fluid fills the space in which the spring 154 is contained and flows through the center opening of the washer 158 into the passage 140 as far as the piston 190. Thus the piston 190 separates the liquid 200 in the valve housing from the environmental liquid which enters through the opening 202.

As the depth of immersion of the valve housing 100 in the environmental fluid increases, the increased pressure is transmitted through the piston 190 to the liquid 200 so that the pressure within the shell 104 and all communicating passages and clearances increases in proportion to the pressure of the environmental fluid that surrounds the valve housing 100. This is in accordance with the principle of operation of the valve assembly shown in FIGURES 1–3, the piston 190 in FIGURE 4 constituting a movable wall in place of the diaphragm 86 of FIGURE 1.

FIGURE 4 does have an additional feature, however, in that excessive pressure of the liquid 200 can be relieved by movement of the piston 190 into the dotted-line position shown in FIGURE 4, as previously explained. This increase in internal pressure in the shell 104 and its communicating spaces can arise in the event that pressure in the valve chamber 110 leaks past the seal 148 into the left-hand portion of the guide in which the piston portion 130 of the valve element slides.

Power for the coil 168 is supplied through a cable 206 which enters the valve housing 100 through a fitting 208. There are conductors 210 of the cable 206 extending through a space 212 within the valve housing, but this space is filled with the liquid 200 to equalize pressure on both sides of the fitting 208. A clearance 214 between the coil 168 and a part of the end wall of the body portion 202 provides communication between the space 212 and the other spaces of the valve housing in which the liquid 200 is contained.

FIGURE 5 shows a valve housing 100' which is the same as that shown in FIGURE 4 except that there is piping 220 connected with the spring retainer at the end of the housing 100' for supplying fluid under pressure in place of the environmental fluid which enters the opening 202 (FIGURE 4) in the valve housing 100. This opening 202 can be threaded when the valve housing is to be used with a source of fluid from a pump or tank. FIGURE 5 shows a tank 222 which supplies fluid under pressure to the piping 220 through a shut-off valve 224 and pressure regulator 226. The tank 222 is shown with a gauge 228. Fluid is supplied to the tank 222 from a pump 230 driven by an electric motor 232.

With the fluid supply under pressure through the piping 220 seals are required between the nut 118 and the spring retainer 156. The piston 190 and sealing ring 192 are unnecessary if seals are used between the nut 118 and the spring retainer 156 with a fluid supply pipe 220.

If the fluid supplied to the piping 220 is a liquid, the liquid may be pumped into the tank 222 with compressed air above it; but the combination shown in FIGURE 5 can be used with compressed air is the fluid which is supplied through the piping 220 to the valve housing 100'.

The preferred embodiments of the invention have been illustrated and described, and the invention is defined in the appended claims.

What is claimed is:

1. A valve structure including a housing containing a valve chamber having a seat therein and a valve, located in said chamber, that moves toward and from the seat to control passage of fluid through the valve chamber, inlet and outlet ports for the valve chamber on opposite sides of the valve seat, an actuator chamber in the housing, an actuator in said actuator chamber, other spaces within the housing including guides, parts connected with the valve and movable in said guides, the actuator chamber and the other spaces communicating with one another, means sealing the valve chamber from the actuator chamber and said other spaces to prevent fluid in the valve chamber from mixing with liquid fluid in the actuator chamber and other spaces and vice versa, and means for controlling the pressure of the fluid in the actuator chamber and other spaces, including a wall movable independently of the valve and exposed on one side to the fluid in the actuator chamber and exposed on the other side to the ambient atmosphere or water or other fluid to which the housing of the valve structure is subjected from outside the housing when in use, the movable wall being operated by differences in the pressure of the fluids on opposite sides thereof, but comprising a seal preventing escape of fluid from the actuator chamber and said other spaces and preventing the fluid from outside the housing from entering the actuator chamber and other spaces.

2. The valve structure described in claim 1 characterized by the valve having a stem portion that slides in one of the guides, and the means sealing the valve chamber being a seal surrounding the stem portion and sealing the valve chamber from the portion of the guide on the side of the seal that faces away from the valve chamber, the portion of the guide on one side of the seal communicating with the valve chmaber and the portion of the guide on the other side of the seal communicating with the actuator chamber.

3. The valve structure described in claim 2 characterized by there being stem portions in alignment with one another on opposite sides of the valve, there being a seal surrounding each of the stem portions and sealing the valve chamber from the portions of both guides beyond the seal, one of the guides at one end of the valve remote from the actuator being in communication with the actuator chamber through an axial passage through the valve.

4. The valve structure described in claim 3 characterized by the stem portions of the valve being balancing pistons thereon operating in the guides and each of an area that substantially pressure-balances the valve for the pressure in the valve chamber on both sides of the seat, and seals on the piston portions for preventing flow of fluid along the guides and past the piston portions of the valve.

5. The valve structure described in claim 4 characterized by the actuator being an electromagnet and an armature that is attracted by the magnet when the magnet is energized, and motion-transmitting means in the actuator chamber and guide spaces operably connecting the armature with the valve and exposed to the pressure of the liquid in said actuator chamber and in the spaces communicating with the actuator chamber.

6. The valve structure described in claim 2 characterized by the means for controlling the pressure of the fluid in the actuator chamber and the communicating spaces being movable to change the combined volume of the actuator chamber and communicating spaces, and an escape passage that is uncovered by movement of the pressure control means beyond a given location as it moves in a direction to increase the combined volume of the actuator chamber and its communicating spaces whereby the escape passage provides a relief of pressure caused by fluid in the valve chamber leaking into a space that communicates with the actuator chamber.

7. The valve structure described in claim 1 characterized by fluid in the actuator chamber comprising a liquid filling the otherwise empty spaces in the actuator chamber and other spaces that communicate with the actuator chamber.

8. The valve structure described in claim 7 characterized by the housing having an opening therein through which the movable wall is exposed to the pressure of the fluid surrounding the housing.

9. The valve structure described in claim 8 characterized by the movable wall being a flexible diaphragm in contact with the liquid in the housing on one side and having its other side in contact with water or other fluid that surrounds the outside of the housing whereby the liquid pressure in the housing varies as the pressure of the fluid outside the housing when the housing is submerged to different depths in said water or other fluid.

10. The valve structure described in claim 8 characterized by the movable wall being a piston exposed at one end to the liquid that is in the actuator chamber and the communicating spaces of the housing, and exposed at its other end to the fluid which enters the housing through said opening communicating with the outside.

References Cited

UNITED STATES PATENTS

| | | | |
|---|---|---|---|
| 3,181,040 | 4/1965 | Viale et al. | 251—129 |
| 3,329,165 | 7/1967 | Lang | 251—129 X |
| 3,368,791 | 2/1968 | Wetts | 251—129 |

FOREIGN PATENTS

| | | |
|---|---|---|
| 563,479 | 9/1958 | Canada. |
| 1,169,163 | 9/1958 | France. |

ROBERT W. JENKINS, Primary Examiner

L. G. MACHLIN, Assistant Examiner

U.S. Cl. X.R.

251—214